INVENTORS.
HARRY W. BROWN, SR.
BY GEORGE MARKEVICH
ATTORNEYS

June 15, 1965   H. W. BROWN, SR., ET AL   3,188,666
TAPER THREADING DEVICE

Filed Jan. 15, 1962   3 Sheets-Sheet 2

INVENTORS.
HARRY W. BROWN, SR.
BY GEORGE MARKEVICH
Woodling, Krost,
Granger and Rust
ATTORNEYS June 15, 1965    H. W. BROWN, SR., ET AL    3,188,666
TAPER THREADING DEVICE Filed Jan. 15, 1962    3 Sheets-Sheet 3

INVENTORS.
HARRY W. BROWN, SR.
BY GEORGE MARKEVICH
Woodling, Krost,
Granger and Rust
ATTORNEYS 3,188,666
TAPER THREADING DEVICE
Harry W. Brown, Sr., Willowick, and George Markevich, Seven Hills, Ohio, assignors to The National Acme Company, a corporation of Ohio
Filed Jan. 15, 1962, Ser. No. 166,266
7 Claims. (Cl. 10—96)

The invention relates in general to a threading device and, more particularly, to a threading device to thread taper threads either with thread cutting chasers or with thread rollers.

The taper threading device of the present invention may include generally threading tools movably carried on a housing for movement toward and from the housing axis with a rotatable member journalled relative to the housing. Linkage means connects the rotatable member to the threading tools to effect inward and outward movement of the threading tools upon relative movements of the rotatable member and housing. Cam and follower means coact to effect relative rotation between the rotatable member and the housing upon relative axial movement therebetween and means is provided during a threading operation to move the cam follower axially relative to the housing in accordance with relative axial movement of the workpiece and the threading device with the cam follower coacting with the cam means to effect relative rotation between the rotatable member and the housing to effect gradual movement of the threading tool relative to the axis to produce a taper thread on the workpiece.

An object of the invention is to provide a taper threading device with internal mechanism to effect the taper producing movements of the threading tools.

Another object of the invention is to provide a threading device wherein a hydraulic means may provide a resistance in an axial direction overcome by the relative axial movement of a work piece and threading device during threading operations, and with the hydraulic means capable of a second function of a collapsing action of the threading tools at the end of the threading operation.

Another object of the invention is to provide a taper threading head wherein a single cam is provided to provide for both the taper producing action and the collapsing of the threading tools at the end of the threading operation.

Another object of the invention is to provide a taper threading head which may be used with either thread cutting chasers or with thread forming rollers.

Other objects and a fuller understanding of the invention may be had by referring to the following description and claims, taken in conjunction with the accompanying drawings, in which:

Figure 1:
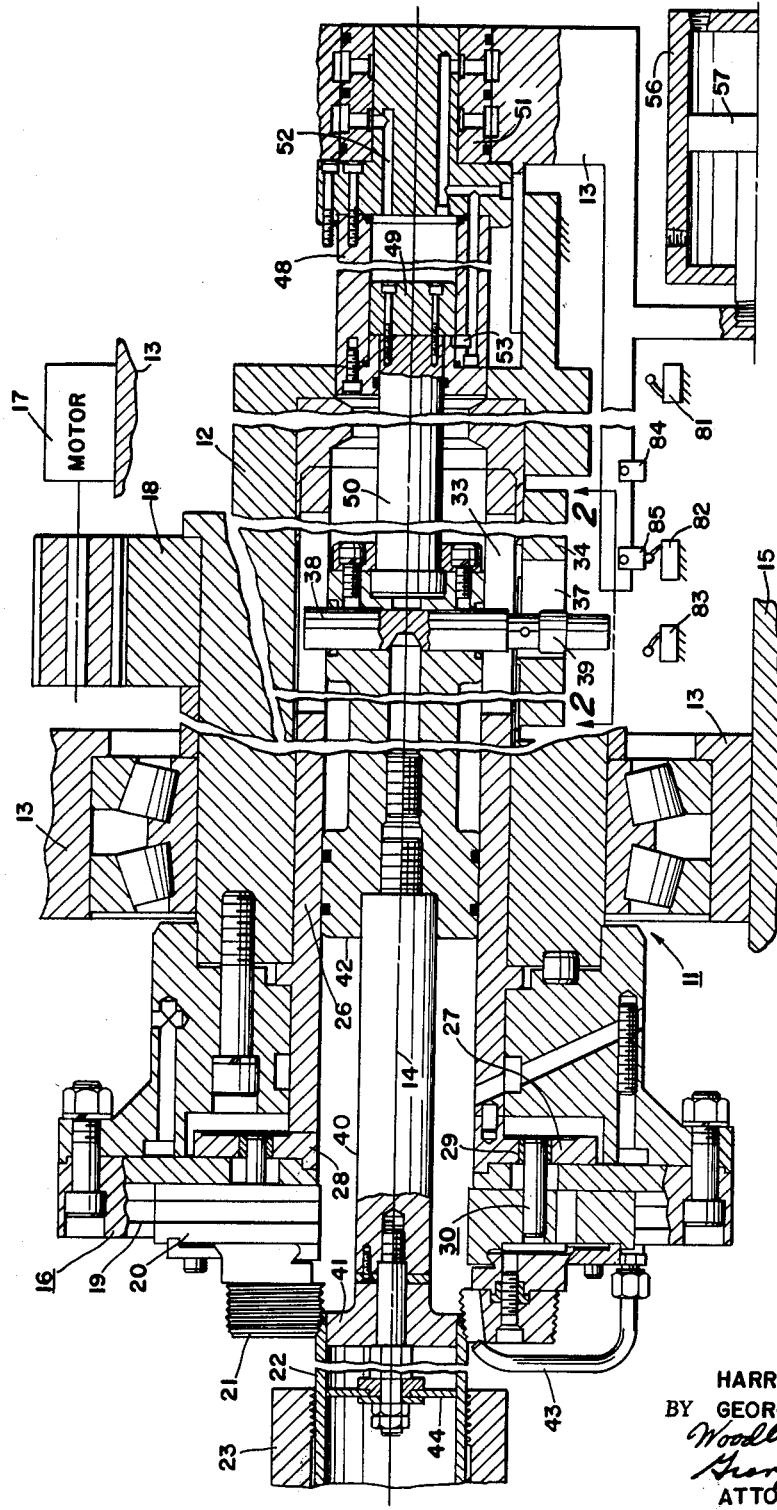
FIGURE 1 is a longitudinal sectional view on line 1—1 of FIGURE 2 of a threading device embodying the invention.

FIGURE 1 generally shows the threading machine 11 which includes a housing 12 journalled in a slide 13. The slide 13 slides on a base 15. The housing 12 has an axis of rotation 14. A motor 17 is carried on the slide 13 and drives the housing 12 in rotation by means of a gear 18.

In this FIGURE 1, the housing 12 is shown as mounting a thread cutting head 16 which has radial dovetailed slots 19 carrying dovetailed chaser slides 20. These slides carry chasers 21 which are tools for threading a workpiece 22. The workpiece may be held by a workholder 23 in a fixed position relative to the base 15.

An inner hollow sleeve 26 is an inner rotatable member journalled coaxially within the housing 12. Linkage means 27 is provided interconnecting the inner sleeve 26 and the chasers 21 to effect inward and outward movement of these chasers upon rotation of the inner sleeve 26. Cam slots 29 are provided in this cam disc and extend in a peripheral direction and also have a radial component. Thus, upon rotation of this cam disc 28, a radial component is imparted to a cam follower pin 30 which is fixed in the chaser slides 20.

An axially parallel slot 33 is provided in the inner sleeve 26. A cam plate 34 is adjustably fixed to the housing 12 by screws 35 and adjusting slots 36, see FIGURE 2. This permits changing the skew of a cam slot 37 which is a straight slot but skewed relative to the axis 14. A cam follower bar 38 carries a follower roller 39 coacting with this cam slot 37. The cam follower bar 38 is carried by a workpiece stop 40 having a forward extension 41 to engage the end of the workpiece 22. A piston 42 is carried on the workpiece stop 40 in order to seal out cutting oil from the rest of the mechanism of the threading machine 11 with this cutting oil supplied through conduits 43 to the chasers 21. A cutting oil seal 44 may also be provided forward of the workpiece stop extension 41 to prevent cutting oil flowing into the interior of the workpiece 22 where such workpiece is hollow.

An adjustable stop 45 may be provided to bear against the cam follower roller 39 with this cam follower moved in a first axial direction which is toward the left as viewed in FIGURE 1. This adjustable stop will establish the initial thread cutting diameter of the chasers 21 as will be apparent hereinafter.

A hydraulic cylinder 48 is fixed to the housing 12 and houses a piston 49. The piston is connected to a connecting rod 50 fastened to the workpiece stop 40 and, hence, to the cam follower bar 38. Since this hydraulic cylinder 48 rotates with the housing 12 in the slide 13 the cylinder is provided with ports fed through a distributor 51. A reset inlet port 52 is provided in the right end of the cylinder 48 as viewed in FIGURE 1 and a collapse inlet port 53 provided at the left end of this cylinder 48. A feed cylinder 56 is parallel to the axis 14 and contains a piston 57 connected to the slide 13 to provide axial feed movements to the entire slide 13 and housing 12 so that relative axial movements between the threading machine 11 and workpiece may be effected for threading operation.

Figure 3:
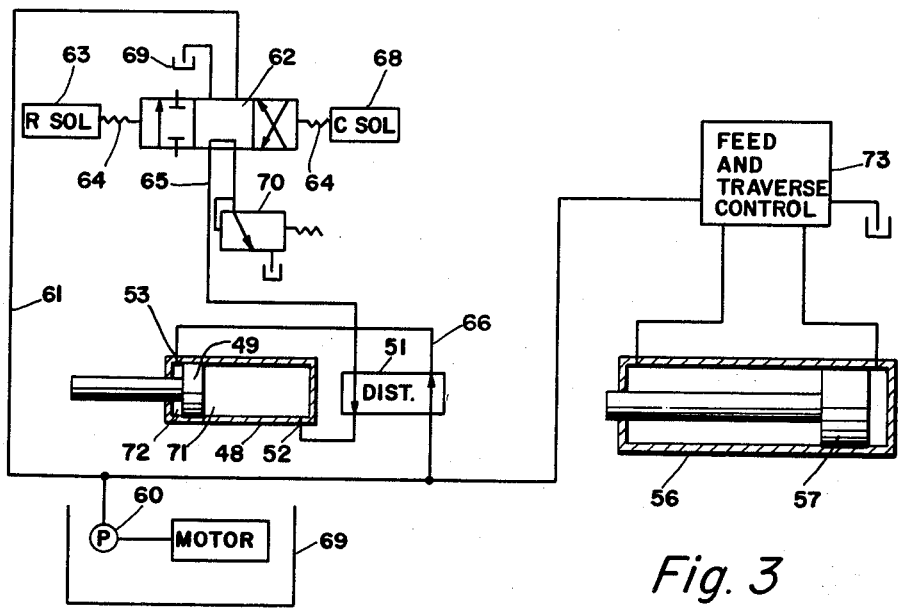
FIGURE 3 is a hydraulic circuit diagram of the hydraulic circuit used with the threading device.

FIGURE 3 shows the hydraulic circuit. A hydraulic pump 60 supplies fluid under pressure to a pressure conduit 61 and from this conduit to a reset valve spool 62. This is a three-position valve and is shown in the neutral central position whereat the fluid flow from the pressure conduit 61 is blocked. A reset solenoid 63 is connected to move the valve spool 62 to the left against the urging of a valve spring 64. With the valve spool 62 urged to the left, then pressure is admitted to a conduit 65 which passes through the distributor 51 to the reset inlet port 52. The pressure line 61 is connected through the distributor 51 by a conduit 66 to the collapse inlet port 53. A collapse solenoid 68 is connected to move the reset valve spool 62 to the right against the urging of the valve springs 64 and in such position conduit 65 is connected to a drain 69. In the neutral position of the reset valve spool 62 as shown, conduit 65 is connected through the valve spool to a pressure relief valve 70 which may be set at some suitable pressure, for example 60% of the pressure of the pump 60. This may be the setting with a two to one ratio in areas of the large area chamber 71 relative to the small area chamber 72 of the hydraulic cylinder 48. The pressure conduit 61 may also supply fluid pressure to a feed and traverse control 73 controlling fluid flow to opposite ends of the feed cylinder 56.

Figure 4:
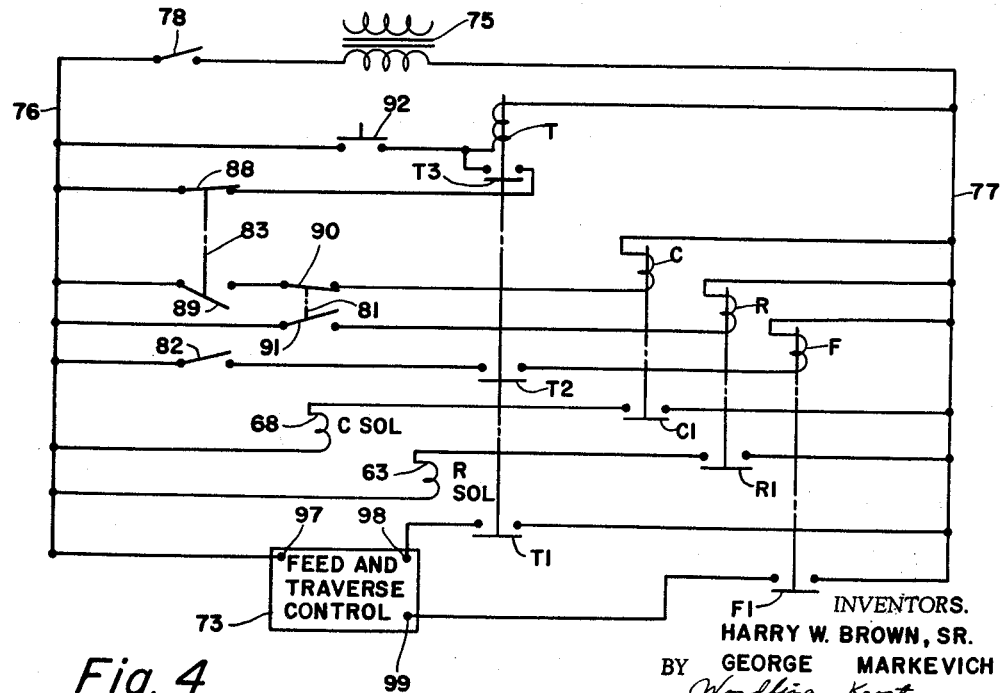
FIGURE 4 is an electrical circuit diagram of the circuit used with the threading device.

FIGURE 4 is a schematic electrical diagram showing conductors 76 and 77 energized through a switch 78 from a transformer 75. First, second and third limit switches 81, 82 and 83 are provided on the machine, as shown in FIGURE 1 with the first limit switch 81 adapted to be actuated by a first dog 84 and the second and third limit switches 82 and 83 adapted to be actuated by a second dog 85, see FIGURE 1. The third limit switch 83 has normally closed contacts 88 and normally open contacts 89. The first limit switch 81 has normally closed contacts 90 and normally open contacts 91. A traverse relay T is connected through a start cycle switch 92 between the conductors 76 and 77. The traverse relay T has normally open contacts T1, T2 and T3. The normally open contacts T3 are connected as hold-in contacts for the traverse relay T with the contacts T3 connected in series with the third limit switch contacts 88, and this series combination connected in parallel with the start cycle switch 92.

A collapse relay C is connected through the third limit switch contacts 89 and the first limit switch contacts 90 between the conductors 76 and 77. A reset relay R is connected through the first limit switch contacts 91 between the conductors 76 and 77. A feed relay F is connected through the second limit switch 82 and the traverse relay contacts T2 between the conductors 76 and 77. The collapse solenoid 68 is connected through collapse relay contacts C1 between the conductors 76 and 77. The reset solenoid 63 is connected through reset relay contacts R1 between conductors 76 and 77. The feed and traverse control 73 has a terminal 97 connected to the conductor 76 and has another terminal 98 connected through the traverse relay contacts T1 to the conductor 77. This feed and traverse control 73 has a third terminal 99 connected through feed relay contacts F1 to the conductor 77.

*Operation*

Figure 2:
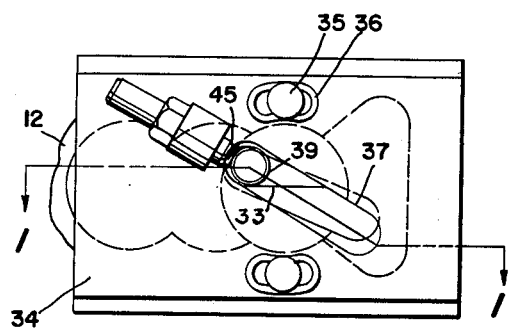
FIGURE 2 is a partial sectional view on line 2—2 of FIGURE 1.

FIGURES 3 and 4 show the electrical and hydraulic circuit for operation in conjunction with FIGURES 1 and 2. The threading machine 11 is shown as one which both rotates and moves axially relative to the stationary workpiece 22 and this provides the relative rotational movement and the relative axial movement between the threading machine 11 and the workpiece 22 in order to produce the threading operation. The workpiece 22 is shown in FIGURE 1 in a position ready to begin the threading operation. Actually, the initial position of the threading machine for loading of the workpiece would have to be to the right sufficiently that the oil seal 44 would clear the end of the workpiece. The workpiece 22 is held in the jaws of the workholder 23. Usually some form of rapid traverse mechanism would be provided to bring the threading machine 11 up to the threading position as shown in FIGURE 1. FIGURE 4 shows that with the switch 78 closed, the conductors 76 and 77 would be energized. Upon depressing the start cycle switch 92, the traverse relay T is energized to close the contacts T1 thereof. The feed and traverse control 73 thus establishes rapid traverse in a first axial direction which is to the left in FIGURE 1 to bring the threading machine 11 to the threading position as shown in FIGURE 1. Before this rapid traverse movement begins, the threading machine is in the right limit position at which the first limit switch 81 would be actuated by the first dog 84. In this initial right limit position, the first limit switch contact 91 would be closed and contact 90 would be open. This means the reset relay R would be energized to close the contacts R1 and energize the reset solenoid 63. FIGURE 3 shows that with the reset solenoid 63 energized, fluid pressure is supplied to conduit 65 and to the large area chamber 71 to move the piston 49 in the first axial direction, namely, to the left in these FIGURES 1 and 3. The same fluid pressure is applied to the small area chamber 72 but in view of the differential area piston 49, the net force is to the left. This action resets the thread cutting head to the smallest cutting diameter, as determined by engagement of cam follower roller 39 with the adjustable stop 45. Adjustment of this stop will thus establish the initial thread cutting diameter.

When the left rapid traverse begins, dog 84 will move off the first limit switch 81 and it will then be in the position shown in FIGURE 4 with the contacts 91 open to de-energize the reset relay R. This de-energizes the reset solenoid 63 and moves it to the neutral center position as shown in FIGURE 3. The threading machine remains in the reset position, however, because there is no force to overcome the fluid under pressure in the large area chamber 71. This, thus, becomes a hydraulic means forming a resistance to movement of the piston 49 to the right and, hence, the workpiece stop 40 is maintained in contact with workpiece 22 as the slide 13 advances to the left in the first axial direction.

Just before the threading machine gets to the position shown in FIGURE 1, the dog 85 actuates the second limit switch 82. This ends the rapid traverse and starts the feed. This is done by the closing of the second limit switch 82 energizing the feed relay F through the then closed contacts T2. The closing of the feed relay contacts F1 establishes the feed and traverse control 73 in the condition for feed movements of the piston 57, with traverse relay contacts T1 still closed. This feed movement may be controlled in synchronism with the rotation of the housing 12 as driven by the motor 17, or it may be merely a continuous urging with the threading machine 11 moving to the left as being pulled by its own previously formed threads on the workpiece 22.

The threading operation thus continues with feed left of the threading machine 11 and the workpiece stop 40 engages the workpiece and moves the cam follower bar 38 in the second axial direction. This moves the piston 49 to the right and in so doing, oil must be forced out of the large area chamber 71 through the pressure relief valve 70. If the ratio of areas of the chamber 71 and 72 is two to one, for example, and the pressure relief valve 70 is set at 60% of the pressure in the conduit 61, then the rightward movement of the piston 49 must overcome a small net fluid pressure in order to move to the right. This, thus, forms the hydraulic means establishing resistance to movement of the piston 49 in a direction opposing the second axial direction of movement of the workpiece stop 40.

As the workpiece stop 40 moves to the right, the cam follower bar 38 coacts with the skewed cam slot 37. This rotates the housing 12 in a first rotational direction relative to the inner sleeve or rotatable member 26. This rotational direction is the same as the rotational direction of the housing 12 during the threading operation to form a righthand thread. This relative rotation between housing 12 and inner sleeve 26 operates through the linkage means 27 to gradually retract the chasers 21. This is a gradual movement relative to the axis 14 to produce a taper thread by radial movement of the chasers in the slots 19 as relative axial movement of the threading device 11 and workpiece 22 proceeds.

The threading operation is terminated by the dog 85 actuating the third limit switch 83. This opens the contacts 88 to de-energize the traverse relay T which also de-energizes the feed relay F by opening the contacts T2. At the same time the third limit switch contacts 89 are closed and energize the collapse relay C through the then closed first limit switch contacts 90. This energizes the collapse solenoid 68 and FIGURE 3 shows that this connects conduit 65 to the drain 69, whereupon fluid pressure in the small area chamber 72 moves the piston 49 to the right quite rapidly. This rapid movement pulls the cam follower bar 38 rapidly in the second axial direction and, thus, the cam follower roller 39 coacts with the skewed cam slot 37. This rapidly rotates the housing 12 in the first rotational direction relative to the inner sleeve 26 and acts through the linkage means 27 to give the rapid collapsing movement to the chasers 21. The opening of the traverse relay contacts T1 causes the feed and traverse control 73 to give rapid traverse right to the threading machine 11 to effect axial separation of the machine 11 from the workpiece 22. When the right limit position is reached, the first limit switch 81 is actuated energizing the reset relay R and the reset solenoid 63 to reset the threading head ready for another cycle of operation.

Figure 6:
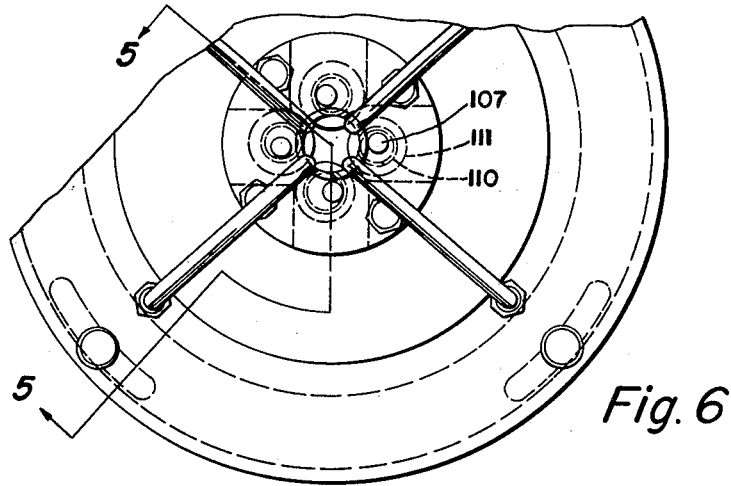
Figure 5:
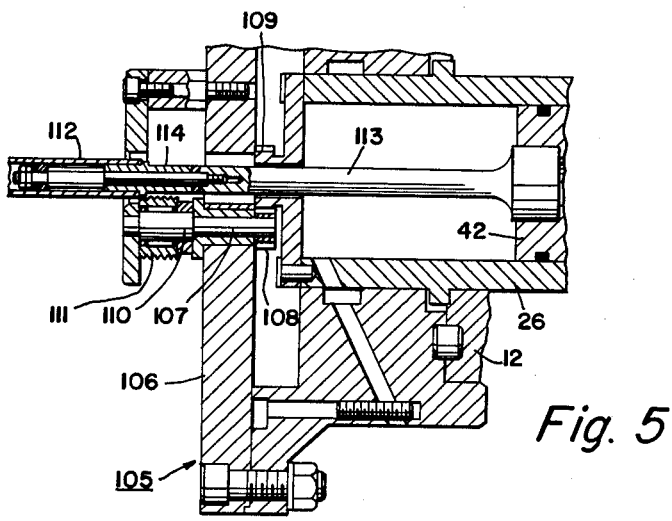
FIGURE 5 is a longitudinal sectional view of a thread rolling head usable with the threading device of the invention and taken on line 5—5 of FIGURE 6; and, FIGURE 6 is a front elevational view of the head of FIGURE 5.

FIGURES 5 and 6 show a thread rolling head 105 which may be easily incorporated on the threading machine 11. This head 105 utilizes the same inner sleeve 26 plus a new front plate 106 journalling thread rolling spindles 107. Four such spindles are shown and each carries a fixed pinion 108 meshing with a central gear 109 fixed to the inner sleeve 26. Each thread rolling spindle has an eccentric 110 journalling a thread forming roll 111 and these four thread rolls 111 may be used to roll a thread on a workpiece 112. A workpiece stop 113 has a forward extension 114 to engage the workpiece 112 and also engages the piston 42 to actuate same rearwardly. The workpiece 112 has been shown as considerably smaller in diameter than the workpiece 22 of FIGURE 1 to illustrate the versatility of the threading machine 11 in its ability to accept thread cutting heads or thread rolling heads of different ranges of diameters. Again, it will be noted that if the adjustable stop 45 in FIGURE 1 is changed in position, this changes the forward limit position of the cam follower bar 38 and, hence, changes the relative rotational position of the inner sleeve 26 and the front plate 106 and, because of the gearing 108–109 and the eccentrics 110, this changes the initial thread forming diameter of the thread rolls 111. It will be apparent that the thread rolling head 105 acts in the same way as the thread cutting head 16 of FIGURE 1 with respect to forming taper threads and with respect to quick collapsing of this head.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A taper threading device for threading a workpiece comprising, in combination, a housing having an axis, a threading tool movably carried on said housing for movement toward and from said axis and for non-rotation on said housing relative to said axis, a rotatable member journalled coaxially relative to said housing, linkage means interconnecting said rotatable member and said threading tool to effect inward and outward movement of said threading tool upon relative rotative movements of said rotatable member and said housing, cam and follower means coacting to effect relative rotation between said rotatable member and said housing upon relative axial movement therebetween, means during a threading operation to move said cam follower axially relative to said housing in accordance with relative axial movement of any said workpiece and said threading device with said cam follower coacting with a first portion of said cam means to effect relative rotation between said rotatable member and said housing to effect gradual movement of said threading tool relative to said axis to produce a taper thread on any said workpiece, a second portion on said cam means extending in the same general direction as said first portion, and power means to rapidly move said cam follower axially relative to said housing in cooperation with said second portion of said cam means to provide a collapsing action to said threading tool.

2. A taper threading device for threading a workpiece comprising, in combination, a housing having an axis, a threading tool movably carried on said housing for movement toward and from said axis and for non-rotation on said housing relative to said axis, a rotatable member journalled coaxially relative to said housing, linkage means interconnecting said rotatable member and said threading tool to effect inward and outward movement of said threading tool upon rotative movements of said rotatable member relative to said housing, a cam and a cam follower coacting between said rotatable member and said housing, hydraulic means, means to establish said hydraulic means as a resistance to axial movement of said cam follower relative to said housing, means coacting with said cam follower during a threading operation to move said cam follower axially relative to said housing against said resistance in accordance with relative axial movement of any said workpiece and said threading device with said cam follower coacting with a first portion of said cam to effect relative rotation between said rotatable member and said housing to effect gradual movement of said threading tool relative to said axis to produce a taper thread on any said workpiece, a second portion on said cam means extending in the same general direction as said first portion, and means to establish said hydraulic means for rapid axial movement of said cam follower in the same direction relative to said cam as during taper threading to cause said cam follower to coact with said second portion of said cam to provide a rapid collapsing action to said threading tool.

3. A taper threading device for threading a workpiece comprising, in combination, a housing having an axis, a threading tool movably carried on said housing for movement toward and from said axis and for non-rotation on said housing relative to said axis, a rotatable member journalled coaxially relative to said housing, linkage means interconnecting said rotatable member and said threading tool to effect inward and outward movement of said threading tool upon rotative movements of said rotatable member relative to said housing, a cam and a cam follower coacting between said rotatable member and said housing, drive means to relatively rotate said housing and any said workpiece about said axis to thread the workpiece, means coacting with said cam follower during a threading operation to move said cam follower axially relative to said housing in accordance with relative axial movement of any said workpiece and said threading device with said cam follower coacting with a first portion of said cam to effect relative rotation between said rotatable member and said housing to effect gradual movement of said threading tool relative to said axis to produce a taper thread on any said workpiece, a second portion on said cam substantially parallel to said first portion, and hydraulic means to rapidly move said cam follower axially relative to said housing in cooperation with said second portion of said cam to provide a collapsing action to said threading tool.

4. A taper threading head comprising, in combination, a housing having an axis, threading tools carried on said housing for movement toward and from said axis, an inner hollow sleeve journalled coaxially in said housing, linkage means interconnecting said inner sleeve and said threading tools to effect inward and outward movement of said threading tools upon rotation of said inner sleeve relative to said housing, an axially parallel slot in said inner sleeve, a cam slot in said housing having a cam surface skewed relative to said axis, a cam follower bar transverse to said axis and disposed in said slot in said inner sleeve and said cam slot, means adapted to urge said cam follower bar in a first axial direction toward the threading tool end of said head, means to rotate said housing about said axis in a first rotational direction to thread a workpiece, a workpiece stop coacting with said cam follower bar and any said workpiece being worked by said threading tools, whereby relative axial movement of any said workpiece and said threading head during a threading operation moves said cam follower bar in a second axial direction relative to said housing with said cam follower bar coacting with said cam surface to effect relative rotation between said inner sleeve and said housing in said first rotational direction to effect gradual opening of said threading tools to produce a taper thread on any said workpiece, a collapsing portion on said cam slot, and means to effect rapid movement of said cam follower bar on said collapsing portion of said cam slot to effect rapid opening of said threading tools to collapse said head and effect disengagement of said threading tools with any said workpiece.

5. A taper threading head for threading a workpiece comprising, in combination, a housing having an axis, threading tools movably carried on said housing for movement toward and from said axis, a rotatable member journalled coaxially on said housing, linkage means interconnecting said rotatable member and said threading tools to effect inward and outward movement of said threading tools upon rotation of said rotatable member relative to said housing, a cam and follower coacting between said rotatable member and said housing, means to relatively rotate said housing and any said workpiece about said axis in a first rotational direction to thread the workpiece, a workpiece stop coacting with said cam follower and any said workpiece being worked by said threading tools, whereby relative axial movement of any said workpiece and said threading head during a threading operation moves said cam follower in an axial direction relative to said housing with said cam follower coacting with said cam to effect relative rotation between said rotatable member and said housing in said first rotational direction to effect gradual movement of said threading tools relative to said axis to produce a taper thread on any said workpiece, a collapsing portion on said cam slot extending away from said threading tool end of said head, and hydraulic means to rapidly move said cam follower in said axial direction to effect rapid movement of said threading tools to collapse said head and effect disengagement of said threading tools with any said workpiece.

6. A taper threading head comprising, in combination, a housing having an axis, threading tools movably carried on said housing for movement toward and from said axis, an inner member journalled coaxially relative to said housing, linkage means interconnecting said inner member and said threading tools to effect inward and outward movement of said threading tools upon rotation of said inner sleeve relative to said housing, a slot in said inner member, a slot in said housing, one of said slots having a cam surface skewed relative to said axis, a cam follower bar transverse to said axis and disposed in said slots, hydraulic means urging said cam follower bar in a first axial direction toward the threading tool end of said head, means to relatively rotate said housing and a workpiece about said axis in a first rotational direction to thread any said workpiece, a workpiece stop coacting with said cam follower bar and any said workpiece being worked by said threading tools, means to control said hydraulic means to establish same as a resistance to axial movement, relative axial movement of any said workpiece and said threading head during a threading operation moving said cam follower bar in a second axial direction relative to said housing against the axial resistance of said hydraulic means with said cam follower bar coacting with said cam surface to effect relative rotation between said inner member and said housing in said first rotational direction to effect gradual opening of said threading tools to produce a taper thread on any said workpiece, a collapsing portion on said cam slot and extending away from said threading tool end of said head, and means to control said hydraulic means to relieve said resistance and to rapidly move said cam follower bar in said second axial direction to effect rapid opening of said threading tools to collapse said head and effect disengagement of said threading tools with any said workpiece.

7. A taper threading head comprising, in combination, a housing having an axis, threading tools carried on said housing for movement toward and from said axis, an inner hollow sleeve journalled coaxially in said housing, linkage means interconnecting said inner sleeve and said threading tools to effect inward and outward movement of said threading tools upon rotation of said inner sleeve relative to said housing, an axially parallel slot in said inner sleeve, a cam slot in said housing having a cam surface skewed relative to said axis, a cam follower bar transverse to said axis and disposed in said slot in said inner sleeve in said cam slot, hydraulic means capable of urging said cam follower bar in a first axial direction toward the threading tool end of said head, means acting on said hydraulic means to establish same as a resistance to axial movement, means to rotate said housing about said axis in a first rotational direction to thread a workpiece, a workpiece stop coacting with said cam follower bar and any said workpiece being worked by said threading tools, whereby relative axial movement of any said workpiece and said threading head during a threading operation moves said cam follower bar in a second axial direction relative to said housing against the axial resistance of said hydraulic means with said cam follower bar coacting with said cam surface to effect relative rotation between said inner sleeve and said housing in said first rotational direction to effect gradual opening of said threading tools to produce a taper thread on any said workpiece, a collapsing cam portion on said cam slot generally parallel to said cam surface and extending away from said threading tool end of said head, and means to control said hydraulic means to relieve said resistance and to rapidly move said cam follower bar in said second axial direction on said collapsing cam portion to effect rapid opening of said threading tools to collapse said head and effect disengagement of said threading tools with any said workpiece.

References Cited by the Examiner

UNITED STATES PATENTS

| | | | |
|---|---|---|---|
| 1,527,185 | 2/25 | Hall | 10—120.5 |
| 2,100,376 | 11/37 | Breitenstein. | |
| 2,130,181 | 9/38 | Hogg | 10—120.5 |
| 2,387,294 | 10/45 | Reimischissel et al. | |
| 2,795,805 | 6/57 | Barnes | 10—120.5 |
| 3,041,641 | 7/62 | Hradek et al. | 10—145 |

FOREIGN PATENTS 253,690  6/26  Great Britain.

ANDREW R. JUHASZ, *Primary Examiner.*